March 8, 1932.　　　R. A. BEACH　　　1,848,691

VALVE STRUCTURE

Filed May 8, 1930

INVENTOR
Ralph A. Beach,
By Archworth Martin,
Attorney.

Patented Mar. 8, 1932

1,848,691

UNITED STATES PATENT OFFICE

RALPH A. BEACH, OF BUTLER, PENNSYLVANIA

VALVE STRUCTURE

Application filed May 8, 1930. Serial No. 450,722.

My invention relates to valve structures, and more particularly to testing valves for taking the pressures of gas wells, etc., although it is susceptible of use in various other ways.

One object of my invention is to provide a testing valve of such form that it may not be readily manipulated by unauthorized persons.

Another object of my invention is to provide a valve that is less susceptible of leakage than various types of testing valves heretofore employed in the oil and gas fields.

A further object of my invention is to provide a valve that is especially adapted for convenient operation in conjunction with a testing gauge.

Still another object of my invention is to provide a valve and gauge structure of generally simplified and improved form.

One form which my invention may take is shown in the accompanying drawings, wherein—

Figure 1:
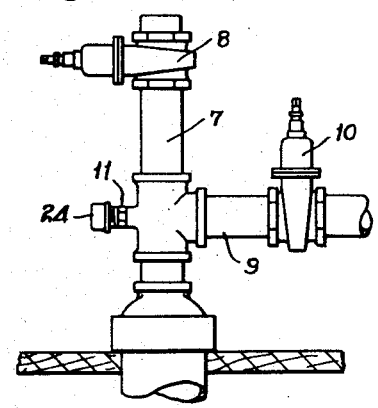
Figure 2:
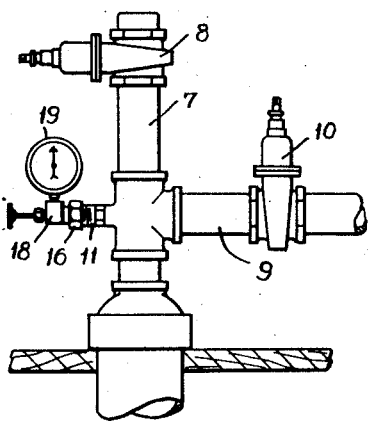
Figures 3, 4:
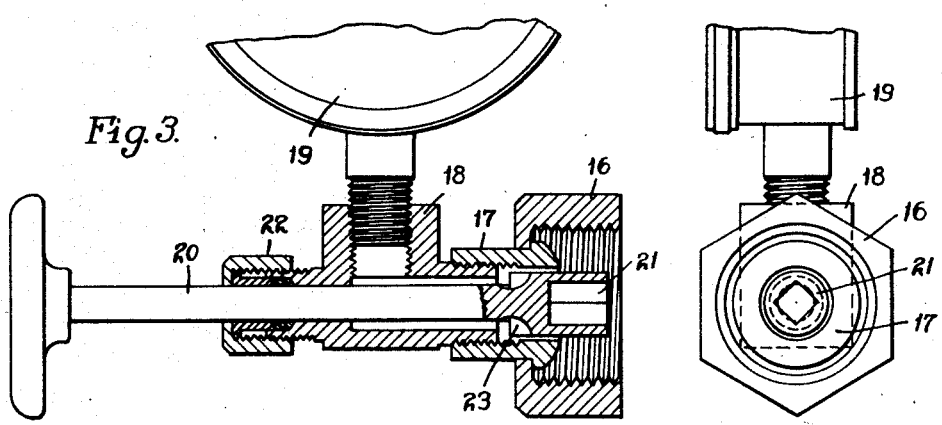
Figure 5:
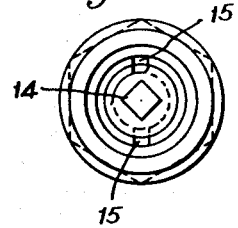
Figure 6:
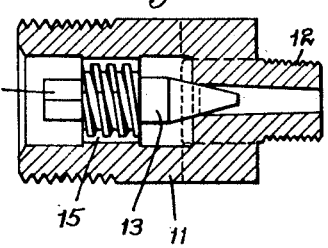

Figure 1 shows a manner in which the valve may be applied to gas well fittings; Fig. 2 shows the valve-operating mechanism and a pressure gauge in assembled relation with the valve; Fig. 3 is a sectional view, on an enlarged scale, of a portion of the apparatus of Fig. 2; Fig. 4 is an end elevational view of the apparatus of Fig. 3; Fig. 5 is an end elevational view of the valve proper, on an enlarged scale, and Fig. 6 is a longitudinal sectional view thereof.

For convenience of description, the apparatus is shown as applied to the tubing 7 of a gas well. The tube 7 is provided with a blow-off valve 8, and a line 9, provided with a gate valve 10, leads from the tubing 7. The valve 8 is normally closed and the valve 10 opened, so that gas may flow from the tube 7 through the line 9 to points of consumption.

Gas wells are periodically tested for pressure by closing the valve 10, the valve 8 being already closed, and applying a gauge to a valve tapped into the tubing 7 or the line 9, at points intermediate the valves 8 and 10. The parts thus far described are well known in the art.

My invention resides more particularly in the provision of an improved form of testing valve and the operating mechanism therefor, in conjunction with a pressure gauge. The pressure valve consists of a valve chamber 11 having a threaded extension 12 that is screwed into the T by means of which the line 9 is connected to the tubing 7. It will, of course, be understood that this valve chamber may be tapped directly into the line 9, or at any other place between the valves 8 and 10.

The valve chamber 11 is provided with a seat for a valve 13 of the needle type, the valve 13 being provided with a squared valve stem 14 by means of which it may be operated, the valve having threaded engagement with the interior of its chamber 11. The chamber 11 is provided with grooves 15 so that gas may flow along the stem of the valve, past the threaded portion thereof.

The valve chamber 11 forms part of a union coupling whose other parts consist of a clamping collar 16 and a ferrule 17, the ferrule 17 being drawn into seating engagement with the outer end of the chamber 11 by means of the collar 16. An L 18 has screw threaded connection with the ferrule 17 and constitutes therewith a conduit leading to a pressure gauge 19. An operating stem 20 extends through one side of the L 18 and carries a socket-like wrench portion 21 at its inner end. A stuffing box 22 prevents leakage from the L 18 past the stem 20. The base of the socket portion 21 is cut away or has projections 23 so that when the stem 20 is in its outermost position, with the base of its socket 21 in abutting engagement with the adjacent end of the L 18, gas may flow from the valve chamber 11, past the socket 21, to the gauge 19.

The normal condition of the well is, as shown in Figure 1, with a cap 24 applied to the exposed end of the valve chamber 11. When it is desired to test the well, the operator will close the valve 10, the valve 8 being of course normally always closed. Thereupon the cap 24 (Fig. 1), will be removed and the coupling member 16 and its associated parts, as shown in Figs. 2 and 3, will be applied to the valve chamber. The operating stem 20 will then be pushed inward so that its socket 21 will engage with the squared end 14 of the valve 13. The application of unscrewing movement to the stem 20 will effect opening of the valve 13 to establish communication between the gauge 19 and the tubing 7, thus permitting indication of the gas pressure upon the pressure gauge. As soon as the reading is taken the operating stem 20 will be turned to move the valve 13 to its seat, whereupon the gauge and its associated parts may be removed from the valve chamber 11.

I claim as my invention:—

1. A testing device for fluid-pressure lines, comprising a valve chamber having at its front side a conduit-like extension adapted for connection to a source of fluid pressure, a valve seat in said chamber, a valve disposed rearwardly of said seat and having threaded connection with the wall of said chamber, a conduit, means for detachably connecting the conduit to the rear side of said chamber, an operating stem extending through said conduit and slidably supported therein, means on the outer side of the valve and on the inner end of the stem, respectively, engageable with one another to non-rotatably connect the stem and the valve when the stem is pushed inwardly, and a pressure gage device carried by the said conduit.

2. A testing device for fluid pressure lines, comprising a valve chamber having at its front side a conduit-like extension adapted for connection to a source of fluid pressure, a valve seat in said chamber, a valve disposed rearwardly of said seat and having threaded connection with the wall of said chamber, a stem carried by said valve, the combined length of the valve and the stem being less than that of the chamber, a conduit, means for detachably connecting the conduit to the rear side of said chamber, an operating stem extending through said conduit and slidably supported therein, a socket portion on the inner end of said operating stem positioned to receive the outer end of the valve stem when the operating stem is pushed inwardly, the said stems being relatively non-rotatable when thus engaged, and a pressure gage device carried by the said conduit.

In testimony whereof I, the said RALPH A. BEACH, have hereunto set my hand.

RALPH A. BEACH.